US008860327B2

(12) United States Patent
Choong et al.

(10) Patent No.: US 8,860,327 B2

(45) Date of Patent: *Oct. 14, 2014

(54) WIRELESS ADAPTATION OF LIGHTING POWER SUPPLY

(71) Applicant: Daintree Networks, Pty. Ltd., Scoresby (AU)

(72) Inventors: Jason Yew Choo Choong, Los Altos, CA (US); Dallas Ivanhoe Buchanan, III, Kentfield, CA (US); Tony Garcia, Millbrae, CA (US); Niall Peter Mai, Rowville (AU)

(73) Assignee: Daintree Networks, Pty. Ltd., Scoresby (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,766

(22) Filed: May 23, 2013

(65) Prior Publication Data

US 2013/0249432 A1 Sep. 26, 2013

Related U.S. Application Data

(63) Continuation of application No. 12/939,517, filed on Nov. 4, 2010, now Pat. No. 8,471,492.

(51) Int. Cl.
*G05F 1/00* (2006.01)
*H05B 37/02* (2006.01)

(Continued)

(52) U.S. Cl.
CPC ............ *H05B 37/02* (2013.01); *H05B 37/0254* (2013.01); *H05B 37/0227* (2013.01); *H05B 37/0272* (2013.01); *G05F 3/08* (2013.01)
USPC .......................................... 315/291; 323/318

(58) Field of Classification Search
None
See application file for complete search history.

(56) References Cited

U.S. PATENT DOCUMENTS 5,811,942 A 9/1998 Pedretti
6,761,470 B2 7/2004 Sid (Continued)

FOREIGN PATENT DOCUMENTS

CN 1586096 A 2/2005
CN 1939098 A 3/2007

(Continued)

OTHER PUBLICATIONS

Notification of Transmittal of the International Search Report and the Written Opinion of the International Searching Authority, PCT/US2011/058964, May 17, 2012, 9 pages.

(Continued)

*Primary Examiner* — Douglas W Owens
*Assistant Examiner* — Dedei K Hammond
(74) *Attorney, Agent, or Firm* — Fish & Richardson P.C.

(57) ABSTRACT

Methods, systems, and apparatus, for wirelessly controlling a power supply device that controls a load. A wireless adapter includes a wireless communication device that receives transmissions from a wireless controller, a serial interface for a serial data connection to a power supply processing device integrated in the power supply device, an adapter processing device that receives the control signals the wireless communication device outputs, generates the control commands from the control signals, and outputs the control commands to the serial interface to cause the power supply processing device to control power provided to the load in a manner specified by the control commands, and an adapter power circuit that receives regulated direct current (DC) power from the power supply device and is powered from the regulated DC power received, and provides power to the wireless communication device and the adapter processing device.

19 Claims, 3 Drawing Sheets

(51) Int. Cl.

| | |
|---|---|
| ***H05B 39/04*** | (2006.01) |
| ***H05B 41/36*** | (2006.01) |
| ***G05F 3/08*** | (2006.01) |
| *B23K 11/24* | (2006.01) |
| *G05B 24/02* | (2006.01) |
| *H02J 1/00* | (2006.01) |
| *H02J 3/12* | (2006.01) |

(56) References Cited

U.S. PATENT DOCUMENTS

| | | | | |
|---|---|---|---|---|
| 2009/0278472 | A1* | 11/2009 | Mills et al. | 315/294 |
| 2010/0299116 | A1* | 11/2010 | Tomastik et al. | 703/2 |
| 2011/0204778 | A1* | 8/2011 | Sadwick et al. | 315/34 |

FOREIGN PATENT DOCUMENTS

| | | | |
|---|---|---|---|
| JP | 5047476 | B | 7/1993 |
| KR | 2007053468 | A | 5/2007 |
| WO | WO03043384 | A1 | 5/2003 |
| WO | WO2010109366 | A1 | 9/2010 |

OTHER PUBLICATIONS

Supplemental European Search Report for EP 11 83 8748 dated Oct. 9, 2013, 3 pages.

* cited by examiner

WIRELESS ADAPTATION OF LIGHTING POWER SUPPLY

CROSS-REFERENCE TO RELATED APPLICATION

This application is a continuation of, and claims priority to, pending U.S. application Ser. No. 12/939,517, entitled "Wireless Adaptation of Lighting Power Supply," filed Nov. 4, 2010, the entire contents of which is incorporated herein by reference.

BACKGROUND

This specification relates to wireless adaptation of lighting power supplies.

Lighting control within buildings is traditionally limited to control of lights in the ceiling that illuminate a general area. This type of control is typically referred to as ambient lighting control. Typically, the power supplies of the lighting devices are controlled by wired control systems and/or by wireless control systems.

Example wired control systems are a combination of wired connections connecting a lighting power supply to a dimmer and power control device and a control signal source that either manually or automatically generates the control signals to adjust the power supply of the lighting device. Such wired control systems include on/off relays and/or phase cut circuits interposed between mains power conductors and a lamp power supply to provide on/off and dimming control, and relays in conjunction with signal control circuits, such as a 0V-10V signal generator that generates an analog signal indicative of a dimming level. While on/off signaling itself is simply a case of whether the power to the ballast is provided or not, support for phase-cutting and 0-10V signaling must be specifically designed into the ballast. This adds cost to the ballast and cost to the control equipment delivering the signals to the ballast.

An example wireless control system is a control device that receives a control signal wirelessly and, through a short wired connection, controls the power supply. Wireless control systems often leverage existing wired control systems and interfaces to enable wireless controls. For example, a wireless switch could provide manual controls for turning the lighting on/off and to dim the lighting by use of a triac for a phase-cut dimming ballast. Likewise, a wireless adapter can include a relay and a 0-10V signal generation circuit and receive wireless signals from a wireless controller to control a dimming ballast driven, in part, by the 0-10V signal.

While the wireless control systems do wirelessly enable a power supply to provide for wireless control, the device that provides the wireless control itself needs to include a mains power (e.g., 120 V, 60 Hz) conditioning and converter circuit to generate regulated DC power, and additional power regulator circuits to generate analog control signals (e.g., a 12 V regulator circuit to generate the 0-10 V dimming signal). Additionally, in some situations, the device that provides the wireless control is deployed in-line with the mains power. Accordingly, the device requires a relay to interrupt power to the controlled power supply. These components add additional expenses to the cost of the devices.

SUMMARY

This specification describes technologies relating to wireless adapters. In general, one innovative aspect of the subject matter described in this specification can be embodied in systems that include a wireless communication device that receives transmissions from a wireless controller, the transmissions including control signals specifying control commands for the power supply device, and to output the control signals; a serial interface for a serial data connection to a power supply processing device integrated in the power supply device; an adapter processing device in data communication with the wireless communication device and that receives the control signals the wireless communication device outputs, generates the control commands from the control signals, and outputs the control commands to the serial interface, wherein the control commands cause the power supply processing device to control power provided to the load in a manner specified by the control commands; and an adapter power circuit that receives regulated direct current (DC) power from the power supply device and is powered from the regulated DC power received, and provides power to the wireless communication device and the adapter processing device. Other embodiments of this aspect include corresponding methods, apparatus, and computer programs, configured to perform the actions of the methods, encoded on computer storage devices.

Particular embodiments of the subject matter described in this specification can be implemented to realize one or more of the following advantages. In some implementations, the wireless adapter receives regulated direct current (DC) power from the power supply of a device being controlled by the wireless adapter, and thus leverages off the existing power and conditioning circuitry that already exists in the device being controlled, thereby reducing fabrication costs. The electrical code requirements for using a using a low voltage DC power supply are less stringent than the code requirements for using a mains power supply connection, and thus the wireless adapter can be placed with greater flexibility.

In some implementations, the wireless adapter generates control commands from control signals received over a wireless channel, and outputs the control commands to a serial interface that establishes data communication with the device being controlled. By providing a serial data interface, the wireless adapter need not include specialized circuitry for generating the control signals.

Additionally, reducing the circuitry also reduces the overall power consumption. As the wireless adapters are typically deployed by the hundreds in commercial buildings, the savings for costs associated with the power consumption is significant.

The traditional interfaces described above provide limited interfaces between controlling devices and the power supply device being controller. For example, these interfaces are often limited to turning the ballast on or off, and providing dimming controls. Additional types of communication, which include collecting information about electricity consumption (for instance, for ballasts with integrated power meters) or ballast health/failure detection, are not be possible with traditional interfaces. By exposing a serial interface that a processing device on the power supply device being controlled can use to communicate to another processing device, a wider range of communication can be made available.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
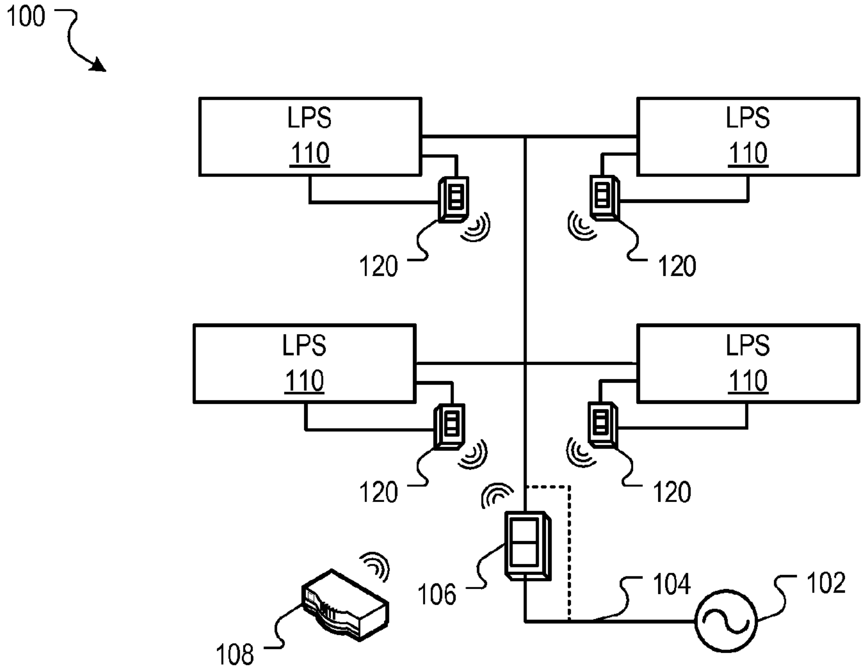
FIG. 1 is a block diagram illustrating a lighting system controlled by a wireless controller and wireless adapters.

FIG. 1 is a block diagram illustrating a lighting system 100 controlled by a wireless controller 108 and wireless adapters 120. The system 100 includes four lighting power supplies (LPS) 110 that are connected to a wall switch 106. The lighting power supplies 110 can, for example, be lighting ballasts in a conference room and which power fluorescent lights. Other lighting power supply devices can also be used, such as a light emitting diode (LED) driver for a LED lighting load, or a high intensity discharge (HID) striker for a HID lamp, etc.

The wall switch 106 is connected to a power source 102, e.g., a single phase AC power line. As shown, the wall switch 106 is a manually activated switch that provides a connection or breaks a connection to the power source 102. In other implementations, the wall switch can be a wireless device that provides control signals to the wireless adapters 120 to control the lighting power supplies 110.

Each of the wireless adapters 120 are connected to a corresponding lighting power supply 110. In some implementations, each wireless adapter 120 receives direct current power from the lighting power supply 110, as will be described in more detail with respect to FIG. 2 below. Additionally, each wireless adapter 120 is in data communication with a corresponding lighting power supply 110 by means of a serial communication interface, which will also be described in more detail with respect to FIG. 2 below.

Each wireless adapter 120 also includes a wireless transceiver that sends and receives data to and from a controller 108. The controller 108 includes power management software that performs power management and power optimization routines to adjust lighting provided by the lighting system 100. As used herein, a "wireless controller" is any device that provides a controller functionality and which sends control signals to the wireless adapters 120. A wireless controller can be a dedicated controller, or can be integrated into another device, such as a wireless switch, another wireless adapter, or a wireless sensor. Example power management and optimization routines include daylighting, dimming in the absence of detected occupancy, and timer control of lighting settings. Other power management routines can also be implemented by the controller 108.

For the purposes of illustration only, the wireless devices may conform to the ZigBee specification, which is based on the IEEE 802.15.4 standard. The IEEE 802.15.4 standard is a standard for low-rate wireless personal area networks (LR-WPANs). The ZigBee specification defines a suite of high level communication protocols that use low-power and low-bandwidth digital radios. The low power consumption and low bandwidth requirements of a ZigBee device reduces cost and prolongs battery life, and thus such devices are often used for sensors, monitors and controls. Other devices that communicate according to other wireless protocols can also be used, and thus the devices and processes described below can be applied to other types of wireless networks as well.

Figure 2:
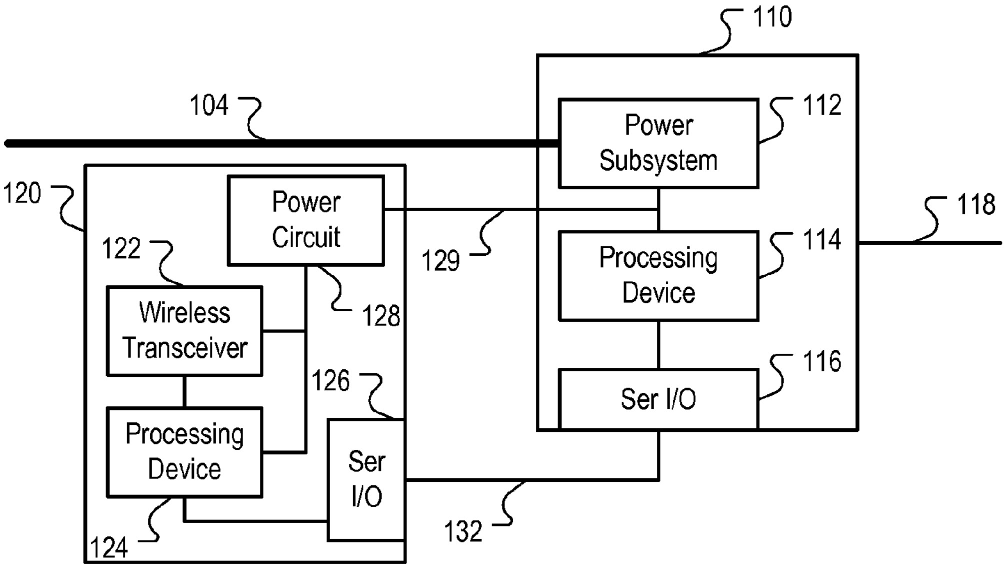
FIG. 2 is a more detailed block diagram of one of the wireless adapters and a lighting power supply.

FIG. 2 is a more detailed block diagram of one of the wireless adapters 120 and a lighting power supply 110. As will be described in more detail below, the wireless adapter 120 is configured to leverage off the existing power control circuitry of the lighting power supply 110 to reduce and/or eliminate power conversion and conditioning circuitry within the wireless adapter. Additionally, in some implementations, the wireless adapter 110 includes a digital communication interface, such as a serial interface, that provides a digital data communication link between a processing device in the wireless adapter 120 and a processing device in the lighting power supply 110. As with the previous feature, a serial data communication link eliminates the need for additional circuitry within the wireless adapter 120 that generates specific control signals for the lighting power supply 110. Example serial interfaces include universal asynchronous receiver/transmitter (UART), serial peripheral interface (SPI), etc.

The wireless adapter 120 includes a wireless communication device, such as a wireless transceiver 122 that receives transmissions from the wireless controller 108. The transmissions including control signals specifying control commands for the lighting power supply device 110, and outputs the control signals to a processing device 124 in the adapter 120. The adapter processing device 124 is in data communication with the wireless transceiver 122, and receives the control signals. The adapter processing device 124 generates the control commands from the control signals (e.g., by using the control signals if the control signals are identical to control commands, or by interpreting the control signals to generate the control commands) and outputs the control commands to the serial interface 126.

The wireless adapter 120 also includes an adapter power circuit 128 that receives regulated direct current power from the power supply device 110 by at least one conductor 129 and is powered from the regulated DC power received. For example, the power circuit 128 may be configured to receive a DC voltage of 5 volts or less (e.g., 3.6V). The adapter power circuit 128 provides power to the wireless communication device 122 and the adapter processing device 124. In some implementations, the power circuit 128 includes protection circuitry to protect the wireless adapter 120 from power surges and discharges. Example protection circuitry includes passive DC limiters, spark gaps, and the like. In some implementations, the protection circuitry includes only passive components.

The lighting power supply 110 includes a power subsystem 112 that receives AC power input, e.g., from mains 104, and generates, among other signals and power output, a regulated power supply signal for a processing device 114, and a power supply for a lighting load 118. The power supply for the lighting load 118 can be either AC or DC and condition by one or more functions (e.g., phase/amplitude cutting, duty cycle adjustment, etc.), depending on the type of lighting load 118 that is powered by the power supply. The power subsystem 112 can include multiple different power conditioning circuits, e.g., the power subsystem 112 includes an AC/DC converter to generate DC power for DC powered components, and an AC conditioning circuit for powering AC lighting loads. The processing device 114 generates control signals that can instruct the power subsystem to adjust the power signal to control the lighting load 118, e.g., to dim or brighten the lighting load 118.

The processing device 114 is in data communication with a serial interface 116 that is connected to the serial interface 126 by at least one conductor 132. The processing device 114 thus receives the control commands from the wireless adapter 120, which, in turn, cause the power supply processing device 114 to control power provided to the load 118 in a manner specified by the control commands.

In some implementations, the control signals are digital signals and the control commands are digital signals that encode an analog value in a range from a first analog value to a second analog value that is different from the first analog value. For example, the control signal can be a digital signal that instructs the wireless adapter 120 dim or brighten the load 118. In some implementations, the processing device 114 is programmed to interpret the digital representation of an analog signal ranging from 0 V to 10 V as a dimming signal. The data transmitted over the serial interface is thus a representation of the analog signal that ranges from 0 V to 10 V. In other implementations, the digital signal represents a directly specified setting and the processing device 114 interprets the digital signal to determine the setting and adjust the power to the lighting load 118 accordingly.

In addition to providing and receiving control data, the wireless adapter 120 can communicate with the processing device 114 of the power supply 120 and receive report status data, such as hours on, power consumption, system health, and the like, provided the processing device 114 is configured to track and provide such data.

Figure 3:
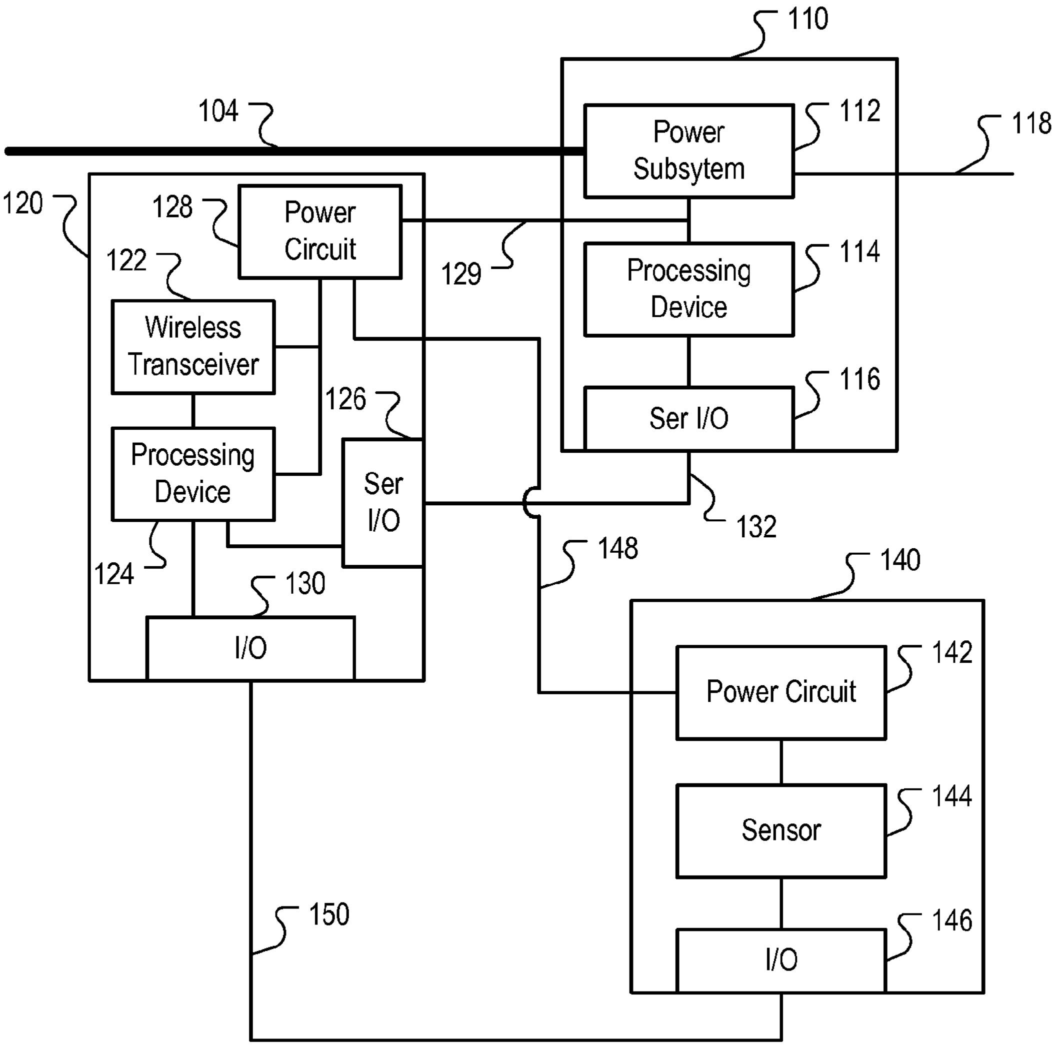
FIG. 3 is a block diagram of the one of the wireless adapters, the lighting power supply, and a local wired control device.

Additional devices can be connected to the wireless adapter to provide additional control features. FIG. 3 is a block diagram of the one of the wireless adapters 120, the lighting power supply 110, and a local wired control device 140. One example local wired control device 140 is an environmental sensor circuit. For example, local wired control device 140 can include a power circuit 142, an environmental sensor 144, and an input/output interface 146. The power circuit 142 is a local power input circuit that receives power from the adapter power circuit 128 and is powered from the power received from the adapter power circuit and provides power to the device 140. In its most simple form, the power circuit 142 can be conductor connections with minimal protection circuitry, e.g., with optional spark gaps, as it need only provide a connection to the power circuit 128 for the other devices within the device 140 that are powered by the power circuit 128. Accordingly, fabrication costs are reduced.

The environmental sensor 144 is a sensor that senses a physical stimulus of an environment and generates physical stimulus data indicative of the physical stimulus. A physical stimulus is a stimulus in an environment that is either indicative of a person's presence or indicative of an environmental change in the environment. For example, the motion of a person is a physical stimulus that can be detected by an occupancy sensor; the body heat of a person can be detected by a thermal sensor; and illumination level can be detected by a photo sensor, etc.

The environmental sensor 144 provides the stimulus data to the local input/output interface 146, which, in turn, provides the stimulus data to the processing device 124 of the wireless adapter 120 by means of at least one conductor 150 and an input/output interface 130.

In some implementations, the data provided by the device is analog data, e.g., an analog signal that is proportional to the physical stimulus the environmental sensor 144 detects. In other implementations, the data provided over the conductor 150 is serial data. In these implementations, the input/output interface 130 can be combined with the interface 126. In still further implementations, both analog and digital data can be provided.

The processing device 124, in turn, instructs the wireless transceiver 122 to transmit the sensor data to the controller 108. The controller 108, executing one or more power management routines, provides commands in response to the sensor data received. Such commands can be, for example, to dim the lighting load 118, brighten the lighting load 118, turn on the lighting load 118, or turn off the lighting load 118.

In some implementations, the wireless adapter 120 is packaged in a packaging that is separate from the power supply device 110. The wireless adapter 120 can thus be mounted separately from the power supply device 110. For example, if the power supply device 110 is a ballast for fluorescent lighting bank, the ballast is typically recessed within the ceiling. The wireless adapter 120 can thus be mounted on the surface of the ceiling to optimize reception and transmission of radio signals. Likewise, the local control device 140 can also be packaged in a package that is configured to be separately mounted from the wireless adapter 120 and the lighting power supply 110. In some implementations, the packaging of the local control device 140 and the wireless adapter 120 can include mating surfaces that interlock and provide the data connections 148 and 150. Accordingly, the wireless adapter 120 and the local control device 140 can be mounted as a single unit separate from the lighting power supply 110.

In other implementations, the devices 110, 120 and 140 can be connected using wired connectors, such as RJ connectors (e.g., RJ11, RJ14, RJ25 or RJ45 wires). For example, between devices 110 and 120, four active wires are provided, two for the connection between the power subsystem 112 and the power circuit 128, and two for the serial connection between the interfaces 116 and 126 (one wire for each directional component). Between the devices 120 and 140, there can be up to six wires, two for the power connection between the circuits 128 and 142, two for analog signals (e.g., one wire for carrying a binary on/off signal and one wire for a 0-3.6V environmental readout signal), and two wires for serial communications.

Figure 4:
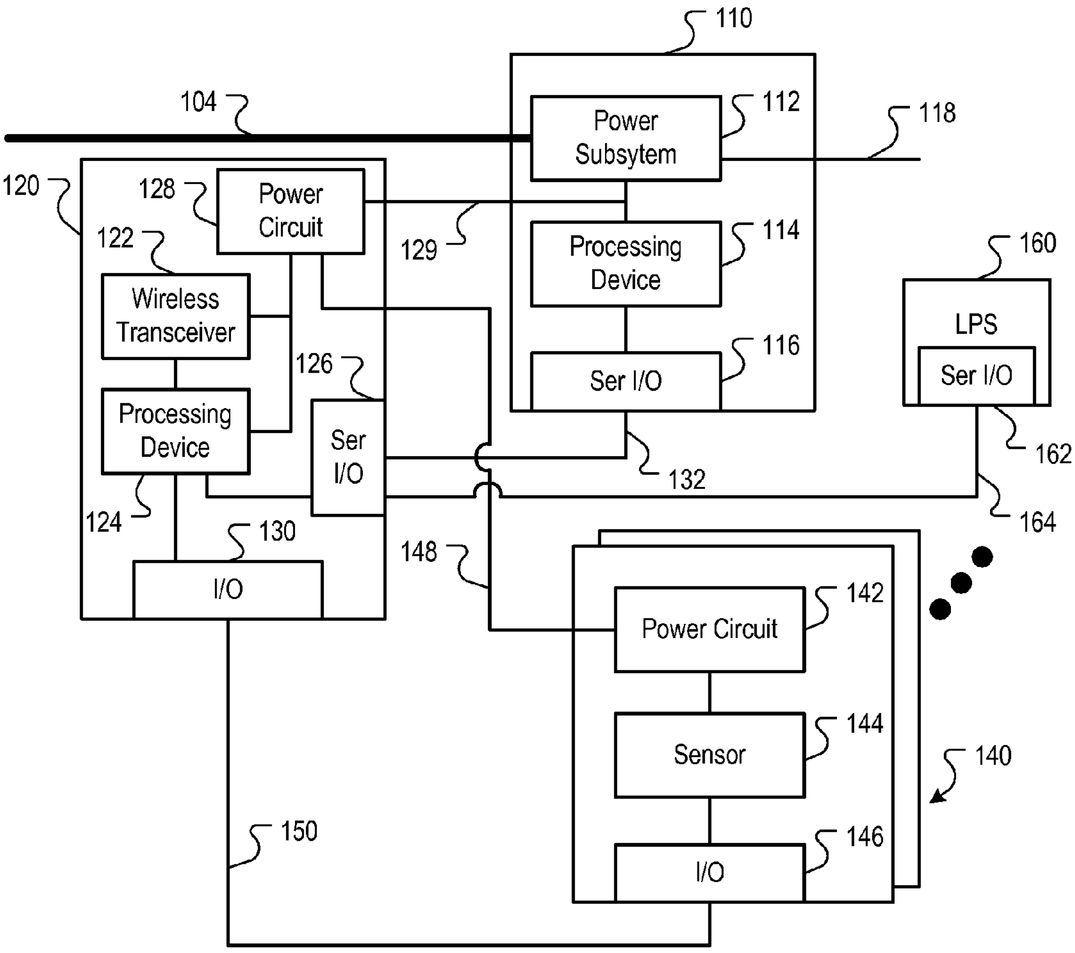
FIG. 4 is a block diagram of the one of the wireless adapters, the lighting power supply, and two local wired control devices.

FIG. 4 is a block diagram of the one of the wireless adapters 120, the lighting power supply 110, and local wired control devices 140 and 160. In FIG. 4, multiple devices 140 are connected to the adapter 120, and each receive power from the power circuit 128. Accordingly, up to n local wired control devices 140 can be connected to an adapter 120, where n is a maximum limit as determined by a fan-out parameter of the power circuit 128, or by the maximum I/O capabilities by the I/O circuit 130.

Additionally, devices that need only serial I/O connections with the adapter 120 can also be connected by use the serial I/O circuit 126. For example, another lighting power supply 160 can be connected by one or more conductors 164 and the serial I/O circuit 162 and controlled by the adapter 120 in a manner similar to the way the lighting power supply 110 is controlled. This lighting power supply 160 need not provide power to the adapter 120, as the adapter 120 is receiving power from the lighting power supply 110, nor does the lighting power supply 160 need power from the adapter 120, as it has its own power source. Accordingly, once the adapter 120 receives power from a lighting power supply 110, it can communicate with other devices that have their own power supplies, and can also provide power to other devices with which it is communicating, if necessary.

While this description uses the example of wireless control for lighting power supplies, the systems described herein applies to any communications technology. For instance, an adapter that is powered in the same way, and using microcontroller-to-microcontroller serial interface can be provide a wired communications technology, such as DALI, or BACNet (using RS-485). While the examples herein deals largely with the use of the system for wireless control, the inherent flexibility of the system to support other communications technologies for controls ensures that such an interface can also enable the benefits described here to be leveraged by control systems using other communications technologies.

Embodiments of the subject matter and the operations described in this specification can be implemented in digital electronic circuitry, or in computer software, firmware, or hardware, including the structures disclosed in this specification and their structural equivalents, or in combinations of one or more of them.

The term “processing device” or “processing system” encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A wireless adapter device for wirelessly controlling a power supply device that controls a load, comprising:

a wireless communication device that receives transmissions from a wireless controller, the transmissions including control signals specifying digital control commands for the power supply device, and that outputs the control signals;

a digital serial interface for a digital serial data connection to a power supply processing device integrated in the power supply device;

an adapter processing device in data communication with the wireless communication device and that receives the control signals the wireless communication device outputs, generates the digital control commands from the control signals without using additional circuitry that generates specific control signals for the power supply device, and outputs the digital control commands to the digital serial interface, wherein the digital control commands cause the power supply processing device to control power provided to the load in a manner specified by the digital control commands;

an environmental sensor that senses a physical stimulus of an environment and generates physical stimulus data indicative of the physical stimulus; and an adapter power circuit that receives regulated direct current (DC) power from the power supply device and is powered from the regulated DC power received, and provides power to the wireless communication device, the environmental sensor and the adapter processing device.

2. The device of claim 1, wherein:

the load controlled by the power supply device is a fluorescent lighting load; and the power supply device is a fluorescent ballast.

3. The device of claim 1, wherein:

the load controlled by the power supply device is a light emitting diode lighting load; and the power supply device is an light emitting diode driver.

4. The device of claim 1, wherein:

the wireless communication device transmits data to the wireless controller;

the adapter processing device instructs the wireless communication device to transmit the physical stimulus data to the wireless controller; and at least some of the control signal received from the wireless adapter are responsive to the physical stimulus data.

5. The device of claim 4, wherein the environmental sensor is an occupancy sensor.

6. The device of claim 4, wherein the environmental sensor is a photo sensor.

7. The device of claim 4, wherein the physical stimulus data comprises binary signal data.

8. The device of claim 1, wherein the wireless adaptor device is packaged in a packaging that is separate from the power supply device and that is configured to be mounted separately from the power supply device.

9. The device of claim 1, further comprising:

a wireless controller that generates the transmissions received by the wireless communication device, and wherein the wireless controller is in data communication with a plurality of wireless adapters, and of which the wireless adapter device is one of the plurality of wireless adapter devices; and wherein the wireless controller controls a plurality of power supply devices that correspond to the plurality of wireless adapter devices.

10. The device of claim 1, wherein the adapter power circuit is configured to receive regulated DC power at a level less than or equal to 5 volts.

11. The device of claim 1, wherein the adapter processing device receives status data from the power supply device, the status data including one or more of hours on data specifying hours on, power consumption data specifying power consumption, and system health data specifying system health.

12. The device of claim 1, wherein:

the digital serial interface receives a digital serial data connection from a second power supply processing device integrated in a second power supply device; and the adapter processing device receives second control signals the wireless communication device outputs, generates second control commands from the second control signals, and outputs the second control commands to the digital serial interface, wherein the second control commands cause the second power supply processing device to control power provided to a second load in a manner specified by the second control commands.

13. The device of claim 1, wherein the digital serial interface is a universal asynchronous receiver/transmitter.

14. The device of claim 1, wherein the digital serial interface is a serial peripheral interface.

15. A method implemented in a wireless adapter device for wirelessly controlling a power supply device that controls a load, the method comprising:

receiving, by a wireless communication device, transmissions from a wireless controller, the transmissions including control signals specifying digital control commands for a power supply device that is separate from the wireless adapter device, and outputting the control signals;

establishing a digital serial data connection, through a digital serial interface, to a power supply processing device integrated in a power supply device;

generating, by an adapter processing device, the digital control commands from the control signals without using additional circuitry that generates specific control signals for the power supply device;

outputting the digital control commands to the power supply device over the digital serial interface, wherein the digital control commands cause the power supply processing device to control power provided to the load in a manner specified by the digital control commands;

sensing, by an environmental sensor, a physical stimulus of an environment and generating, by the environmental sensor, physical stimulus data indicative of the physical stimulus;

receiving regulated direct current (DC) power from the power supply device; and providing power to the wireless communication device, environmental sensor and the adapter processing device from the regulated DC power.

16. The method of claim 15, wherein the wireless adaptor device is packaged in a packaging that is separate from the power supply device and that is configured to be mounted separately from the power supply device.

17. The method of claim 15, wherein the environmental sensor is an occupancy sensor.

18. The method of claim 15, wherein the environmental sensor is a photo sensor.

19. The method of claim 15, wherein the physical stimulus data comprises binary signal data.

* * * * *